United States Patent
Gonidec et al.

[11] Patent Number: 6,158,211
[45] Date of Patent: Dec. 12, 2000

[54] TURBOJET-ENGINE THRUST REVERSER WITH SCOOP-DOORS OF ADJUSTABLE EXHAUST CROSS-SECTION

[75] Inventors: Patrick Gonidec, Montivilliers; Jean Fabrice Marcel Portal, Ste Adresse; Vincent Joseph Rodolphe Studer; Guy Bernard Vauchel, both of Le Havre, all of France

[73] Assignee: Hispano Suiza Aerostructures, France

[21] Appl. No.: 09/333,921

[22] Filed: Jun. 16, 1999

[30] Foreign Application Priority Data

Jun. 18, 1998 [FR] France .................................. 98 07659

[51] Int. Cl.[7] ...................................................... F02K 1/70
[52] U.S. Cl. .............................................................. 60/226.2
[58] Field of Search ................................ 60/226.2, 230

[56] References Cited

U.S. PATENT DOCUMENTS

| | | | |
|---|---|---|---|
| 5,983,625 | 11/1999 | Gonidec et al. | 60/226.2 |
| 5,987,880 | 11/1999 | Culbertson | 60/204 |
| 6,065,285 | 5/2000 | Gonidec et al. | 60/226.2 |

FOREIGN PATENT DOCUMENTS

0 822 327 A1  2/1998  European Pat. Off. .

*Primary Examiner*—Charles G. Freay
*Assistant Examiner*—Ehud Gartenberg
*Attorney, Agent, or Firm*—Bacon & Thomas PLLC

[57] ABSTRACT

A bypass turbojet-engine thrust reverser comprises at least one hollow, pivoting door (3) with an inner conduit (10), defined between an outer structure (4) of the door (3) and an inner structure (5) of the door (3), which guides flow through the door (3) when the door (3) is in a reverse thrust position. At least a downstream part of the outer structure (4) of the door (3) is independent of and displaceable relative to the inner structure (5) of the door (3) and is driven in a centrifugal direction relative to the inner structure (5) by a mechanical drive system such that a downstream exhaust cross-section (S2) of the inner conduit (10), which is less than an intake cross-section (S1) of the inner conduit (10) when the door (3) is in a forward thrust position, is at least equal to the intake cross-section (S1) when the door (3) is in the reverse thrust position.

20 Claims, 8 Drawing Sheets

TURBOJET-ENGINE THRUST REVERSER WITH SCOOP-DOORS OF ADJUSTABLE EXHAUST CROSS-SECTION

BACKGROUND OF THE INVENTION

1. Field of the Invention

The present invention relates to a bypass turbojet-engine thrust reverser. More specifically, the present invention relates to such thrust reverser comprising at least one pivotable hollow door.

2. Background of the Invention

A turbojet engine has a conduit at the rear of the fan for the purpose of channeling the so-called cold, bypass flow. The conduit consists of an inner wall enclosing the actual engine structure to the rear of the fan and an outer wall of which the upstream portion is continuous with an engine casing enclosing the fan. This outer wall is able to simultaneously channel the bypass flow and the primary flow in its downstream portion to the rear of the so-called hot, primary-flow exhaust, as regards mixed or confluent flows pods, for example. However, in other cases, the outer wall only channels the bypass flow, as regards the so-called separate-flows pods.

A wall also may be used to fair the outside of the engine, that is to say the outside of the engine casing enclosing the fan and the outside of the aforementioned outer wall, in order to minimize powerplant drag. This is particularly the case when the turbojet-engines project from the aircraft, for example, when suspended under the wings or mounted to the rear of the fuselage.

Figure 1:
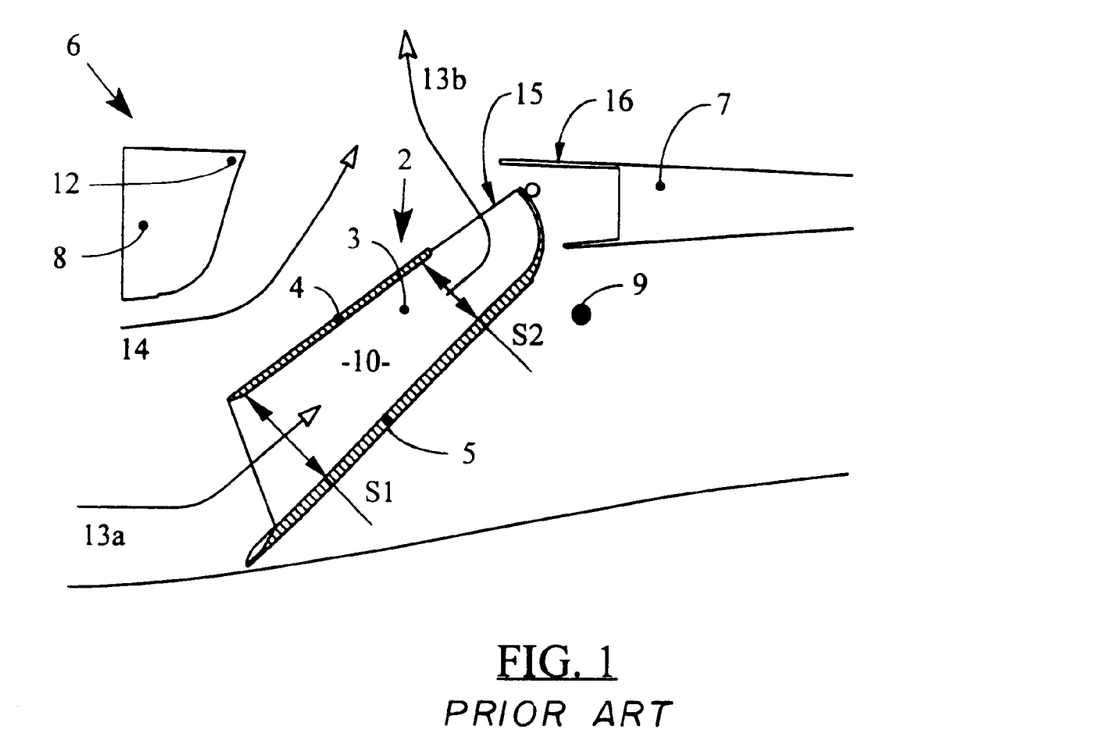
FIG. 1 is partial view in longitudinal section of a known scoop-door thrust reverser taken in a plane through the axis of rotation of an associated turbojet engine of a scoop-door thrust reverser, with the door in a reverse thrust position.
Figure 2:
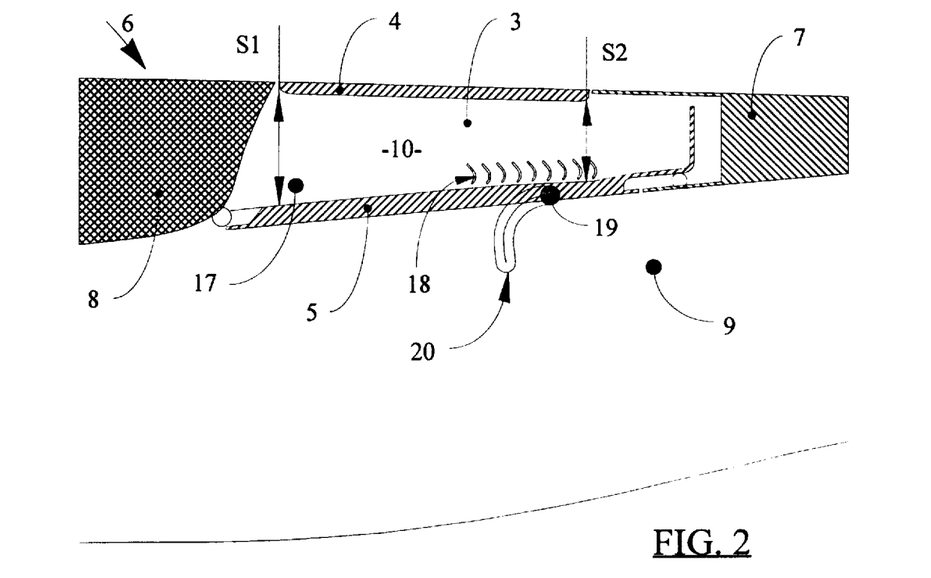
FIG. 2 is a view similar to FIG. 1 of an embodiment of a scoop-door thrust reverser according to the present invention with the door in a forward thrust position.
Figure 3:
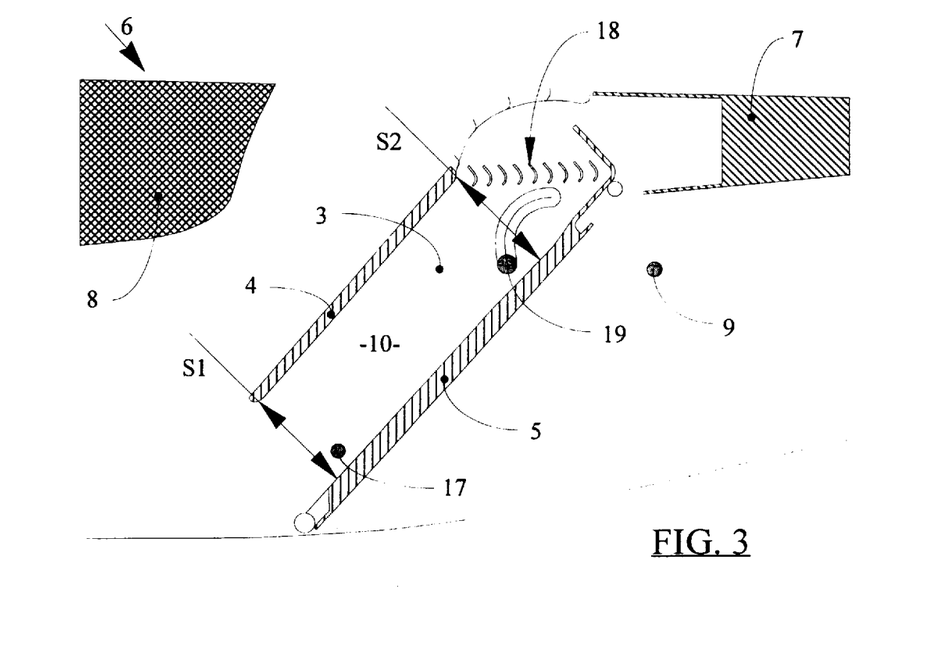
FIG. 3 is the embodiment of FIG. 2 but with the door in the reverse thrust position.

European patent document 0,822,327 describes an illustrative embodiment, shown in FIG. 1 of the attached drawings, of a thrust reverser with hollow doors that act as scoops. This thrust reverser is combined with a bypass turbojet-engine.

The thrust reverser consists of a movable sub-assembly and of a stationary structure. The movable sub-assembly consists of hollow doors 3 including a movable portion 2 which, when in the forward-thrust mode, constitutes part of an external cowling. The stationary structure 6 consists of an upstream portion 8 upstream of the doors 3, a downstream portion 7 downstream of the doors 3 and beams connecting the upstream portion 8 to the downstream portion 7. The stationary structure 6 is also a component of the external cowling.

The doors 3 are mounted along a circumference of the external cowling and are pivotable in a zone downstream of their side walls on the beams linking the downstream portion 7 to the upstream portion 8 of the stationary structure 6 located on either side of the doors 3. The side walls link the outer wall or panel 4 of the doors 3, which constitutes part of the external cowling in the forward thrust mode, to the inner part 5 of the doors 3, which constitutes part of the outer conduit wall.

The upstream portion 8 of the stationary structure comprises a fore frame that may be used to support means controlling the displacement of the doors 3 and illustratively consisting of linear actuators. These means controlling the displacement of the doors 3 also may be situated elsewhere on the periphery of the doors 3, for example downstream of the doors 3. In this case the control means may rest on the downstream portion 7 of the stationary structure 6.

When driven into a reverse thrust position, each of the doors 3 pivots in such a way that a door portion upstream of the pivot 9 will more or less completely obstruct the conduit while clearing a passage in the external cowling to allow channeling respective bypass flows 13 and 14 centrifugally relative to the conduit axis on one hand in an inner conduit or nozzle 10 formed by the structure of the door 3 and, on the other hand, between a deflection edge 12 and the outside of the outer panel 4 of the door 3. A downstream door part moves near the outside of the external cowling. The doors' angular position is adjusted to allow the flow to pass and to strongly reduce, even suppress forward thrust form this flow, and to generale a counter-thrust by producing an upstream-deflected flow component.

The geometric contour of the external cowling enclosing the thrust reverser must provide optimal flight aerodynamic performance. At the present time, this entails constricting the streamlines of the external thrust-reverser structure in the downstream direction of the external cowling. As shown in FIG. 1, the scoop door 3, with an upstream side pivoting centrifugally relative to the turbojet-engine axis, has an effective exhaust cross-section S2 of the inner conduit 10 which is less than an intake cross-section S1 of the inner conduit 10. As a result, the performance in thrust reversal mode is lowered because of the action of the flow 13b leaving the inner conduit 10 of the door 3 on the flow 14 between the deflection edge 12 and the outside of the outer door structure 4. One of the objectives of the present invention is to increase the aerodynamic performance of such scoop doors when in the thrust-reversal mode while still observing the above constraints.

SUMMARY OF THE INVENTION

Such objectives are met by the present invention using a turbojet-engine thrust reverser comprising at least one scoop-type door, similar to that described above, which has at least a downstream part of an outer structure of the door which is independent of and movable relative to an inner structure of the door such that an effective downstream exhaust cross-section S2 of an inner conduit of the door is less than an upstream intake cross-section S1 of the inner conduit of the door when the door is in a forward thrust position and, when the door is in a reverse thrust position, is at least equal to the intake cross-section S1 with the movable part of the outer structure being driven centrifugally relative to the inner structure by a system of mechanical actuators. The outer structure corresponds to the constriction of the external cowling streamlines in the downstream direction when the door is in the forward thrust position.

BRIEF DESCRIPTION OF THE DRAWINGS

Other features and advantages of the invention are elucidated in the following description of several preferred embodiments of the invention, with reference to the attached drawings, in which.

DETAILED DESCRIPTION OF THE PREFERRED EMBODIMENTS

FIGS. 2, 3, 6 and 7 show one embodiment of the invention. A scoop door 3 comprising a main inner structure 5, hinging about a main pivot shaft 9 which rests on the side beams of the stationary structure 6, drives and supports an outer structure 4 of the door 3, hinging in this configuration on an auxiliary pivot shaft 17 supported by the main inner structure 5 of the door 3. A cover 24, shown in FIG. 7, which seals the side walls of the door 3 when the door 3 is in the reverse thrust position, is applied to either the outer structure 4 or the inner structure 5.

A cascade of vanes 18 is positioned inside the external cowling and is affixed on a downstream part 7 of the stationary structure 6. The vanes are configured such that the flow passing through a downstream exhaust cross-section S2 of an inner conduit 10 of the door 3 may be completely guided in the upstream direction. The design of the cascade of vanes 18 is known and its installation on the stationary structure is implemented using rules known to the expert.

At least one roller 19, which may be part of the displaceable part of the outer structure 4, is mounted sideways and toward the downstream side, opposite the auxiliary pivot shaft 17 of the outer structure 4. At least one guide slot 20 affixed to the stationary structure 6 guides the roller 19 when the door 3 is being driven. When the door 3 is in the forward-thrust position, the distance between the main pivot shaft 9 of the door 3 and the roller 19 in the guide slot 20 is less than the distance between the same main pivot shaft 9 of the door 3 and the roller 19 in the guide slot 20 when the door 3 is in the reverse thrust position. The differential of those two values allows the desired exhaust cross-section S2 to be achieved for the forward and reverse thrust positions of the door 3.

A guide path between two end positions of the roller 19 in the guide slot 20 is determined to allow a kinematics of the downstream side of the outer structure 4 which corresponds with the vanes of the cascade 18.

The auxiliary pivot shaft 17 may be replaced by a set of associated linkrods. A first linkrod connects the inner structure 5 of the door 3 to the outer door structure 4. A second linkrod connected to the stationary structure controls displacement of the first linkrod for the purpose of implementing a different exhaust cross-section S2 between the positions of the door 3 in the forward and reversed flow modes.

Moreover, the displaceable part of the outer structure 4 may only consist of part of the total outer structure 4 of the door 3. In this variation, the auxiliary pivot shaft 17 is shifted in the downstream direction of the inner structure 5, and a cover for an upstream part of the stationary structure and the displaceable part of the outer structure 4 may be applied to implement aerodynamic continuity of the external streamlines.

Guidance by the above defined guide slot 20 is advantageously suitable for a lower position of the cascade of vanes 18, which is closer to the inside of the inner structure 5 than to the outer structure 4 of the door 3. A frame of the guide slot 20 may be held in the side walls of the thrust-reverser's stationary structure.

When the cascade of vanes 18 is in a high position, that is near the inside of the displaceable part of the outer structure 4, the downstream end of this displaceable part of the outer structure must comprise a sufficiently unhampered kinematics to clear the upstream most vane of the cascade of vanes 18. Thus being required to be outside the external streamlines, the guide slot 20 may be unsuitable for this situation.

Figure 4:
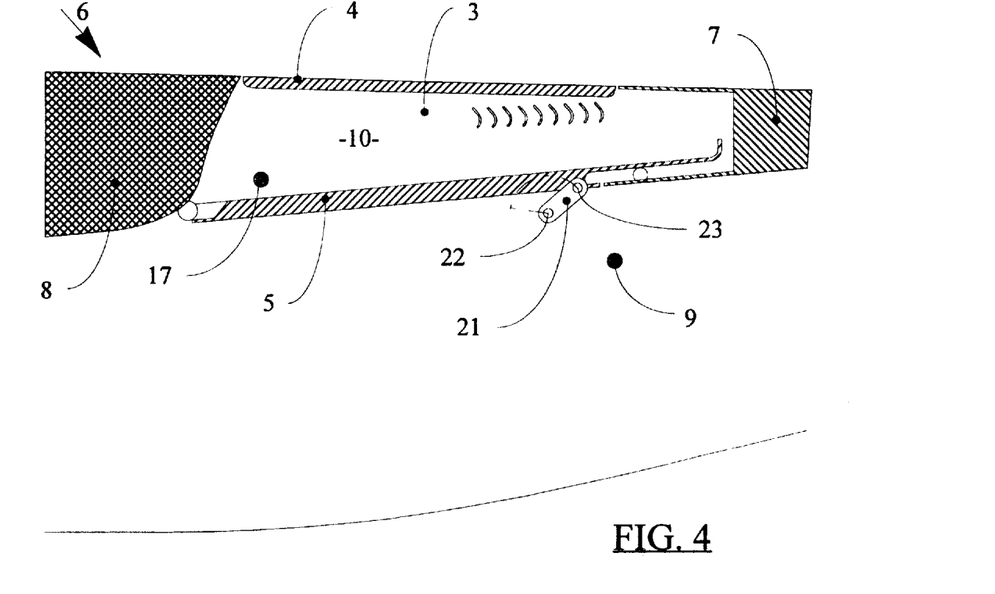
FIG. 4 is a view similar to FIG. 1 of another embodiment of a scoop-door thrust reverser according to the present invention with the door in a forward thrust position.
Figure 5:
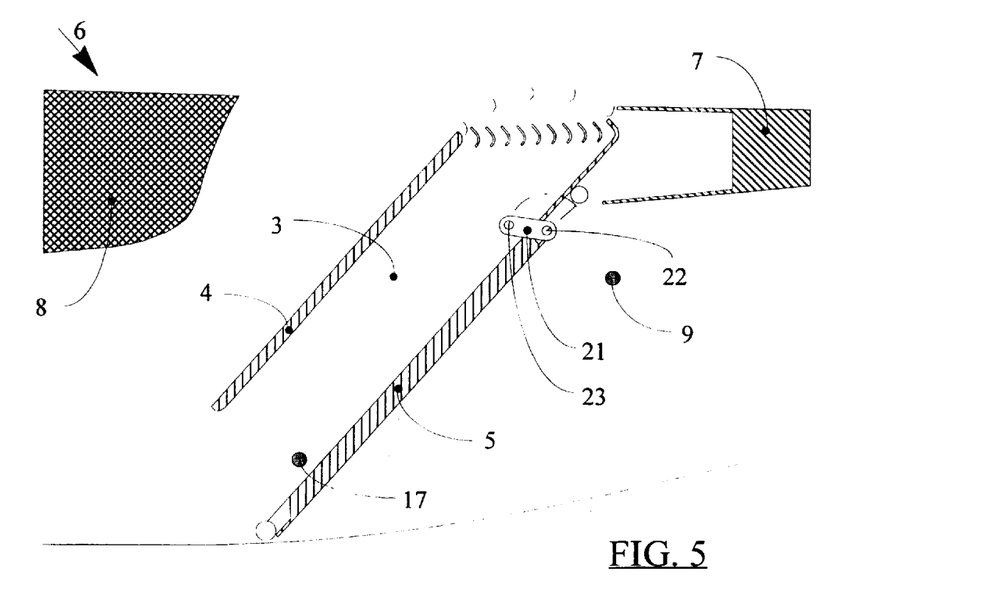
FIG. 5 shows the embodiment of FIG. 4 but with the door in the reverse thrust position.
Figure 6:
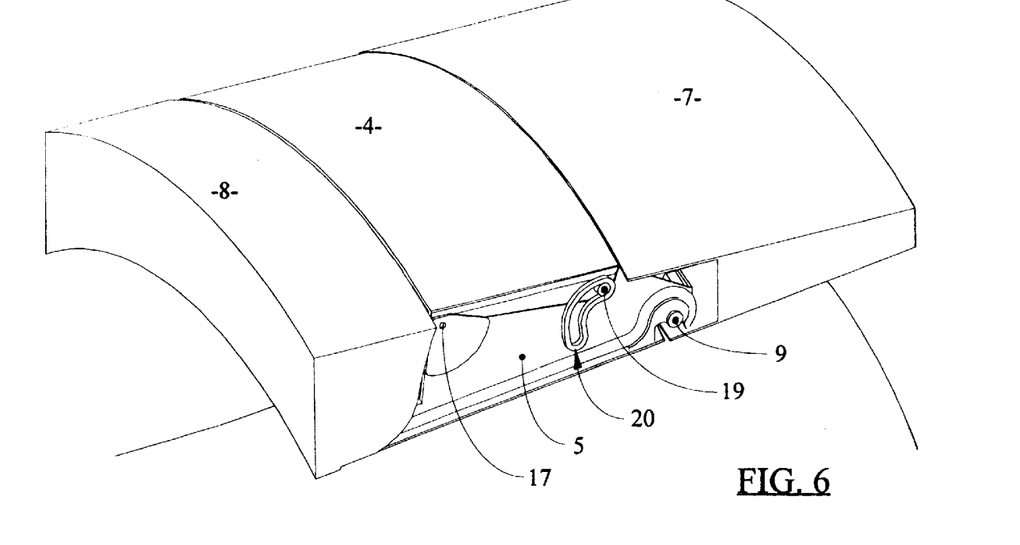
FIGS. 6, 7 are perspective views of the embodiment shown in FIGS. 2 and 3, respectively.
Figure 7:
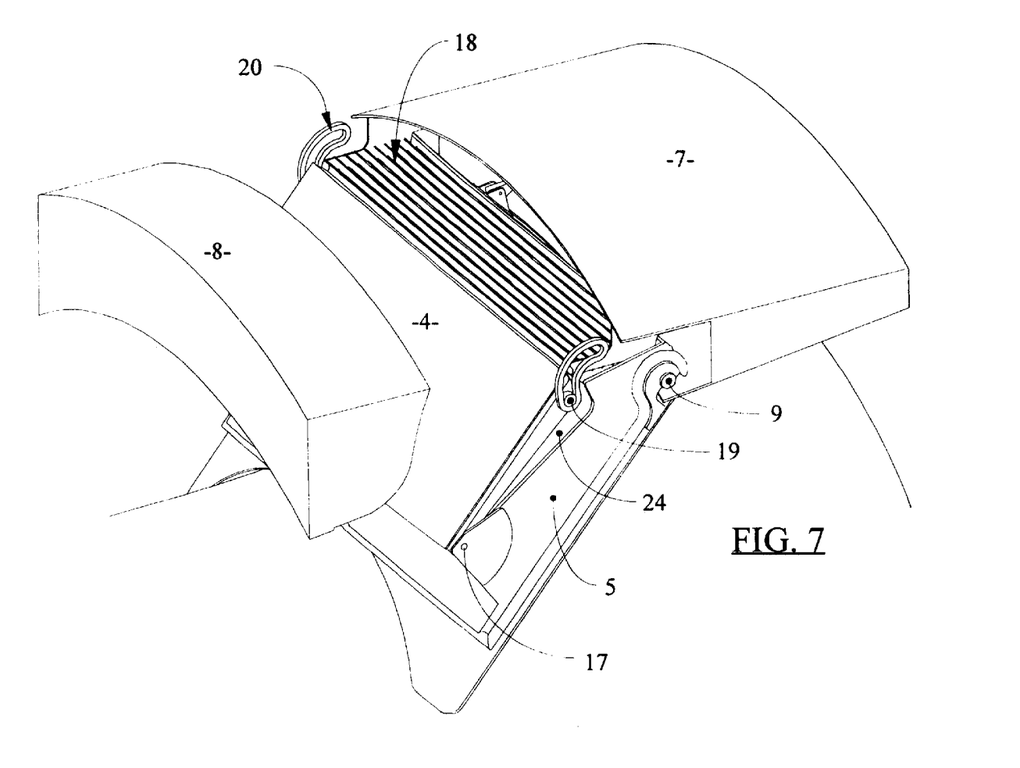
Figure 8:
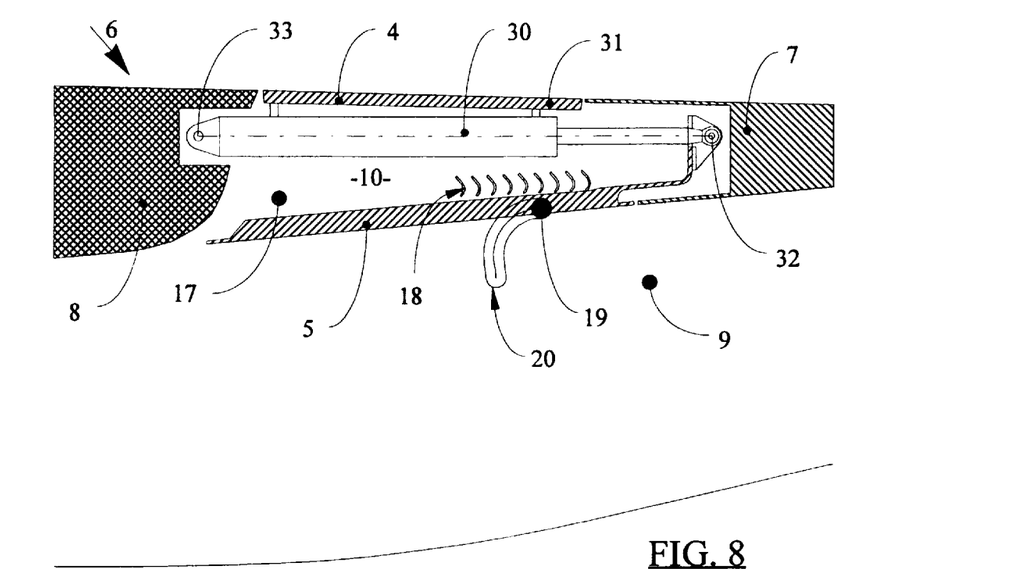
FIG. 8 is a view similar to FIG. 1 of another embodiment of a scoop-door thrust reverser according to the present invention with the door in a forward thrust position.
Figure 9:
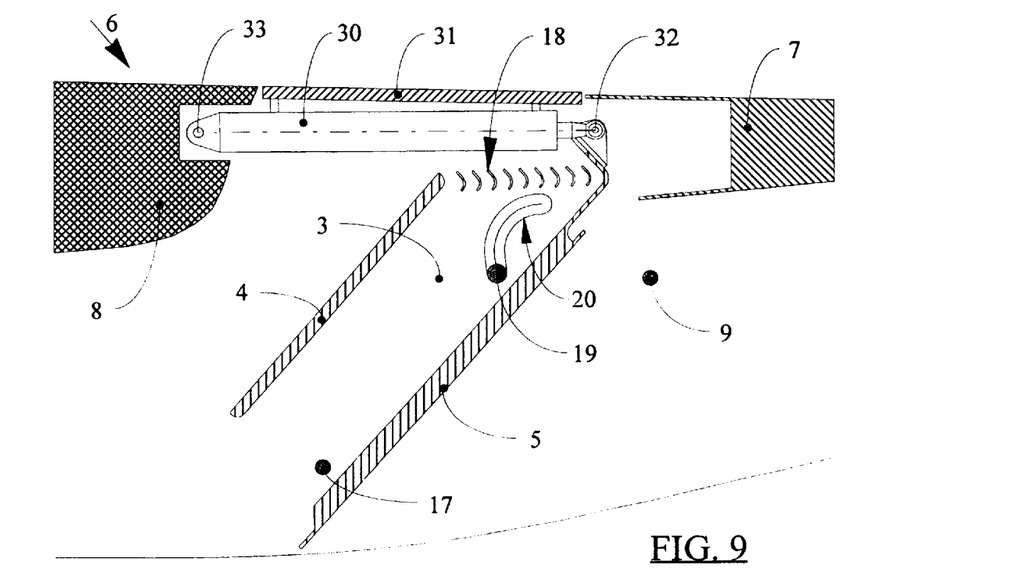
FIG. 9 is the embodiment of FIG. 8 but with the door in the reverse thrust position.
Figure 10:
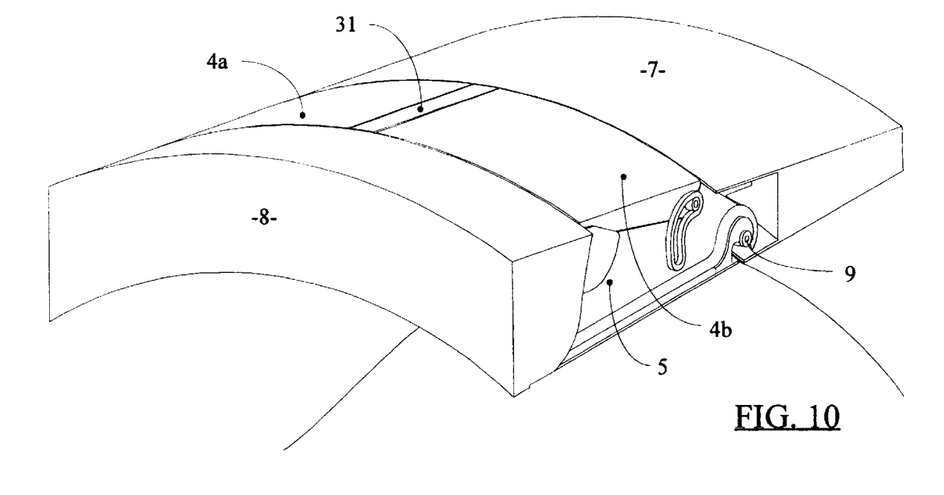
FIGS. 10, 11 are perspective views of the embodiment shown in FIGS. 8 and 9, respectively.

To achieve palliation, FIGS. 4 and 5 show another embodiment of the invention. At least one linkrod 21 hinges on the stationary structure 6 at a first pivot point 22. Preferably the first pivot point 22 is situated nearest the external streamlines and at least on one side wall of the thrust-reverser's stationary structure.

The at least one linkrod 21 is connected to the displaceable part of the outer structure 4 at a second pivot point 23. When the door 3 is being operated, the second pivot point 23 may then go outside of the external streamlines, thus allowing a sufficient clearance of the downstream portion of the displaceable part of the outer structure 4 of the door 3 around the cascade of vanes 18.

FIGS. 8, 9, 10 and 11 show an illustrative drive configuration for the downstream part of the door 3 by an upstream linear actuator. As shown in these Figures, a linear actuator 30 affixed to and hinging on the stationary structure 6 at an attachment point 33 drives the door 3 in rotation about its main pivot shaft 9 at a drive point 32 at a downstream end of the structure of the door 3.

Advantageously, when the main pivot point 9 is in the lower position as shown in the Figures, the linear actuator 30 may be situated along the axis of the door 3 to provide the largest possible distance between the main pivot shaft 9 and the door's drive point 32. The configuration of the displaceable part of the outer structure 4 includes a central structural gap to house the linear actuator 30. The displaceable part of the outer structure 4 may comprise two semi-independent parts 4a and 4b, each driven either in the manner already discussed above or involving the differential rotation of the linear actuator 30 and the door 3 between the forward and reverse thrust positions.

Figure 11:
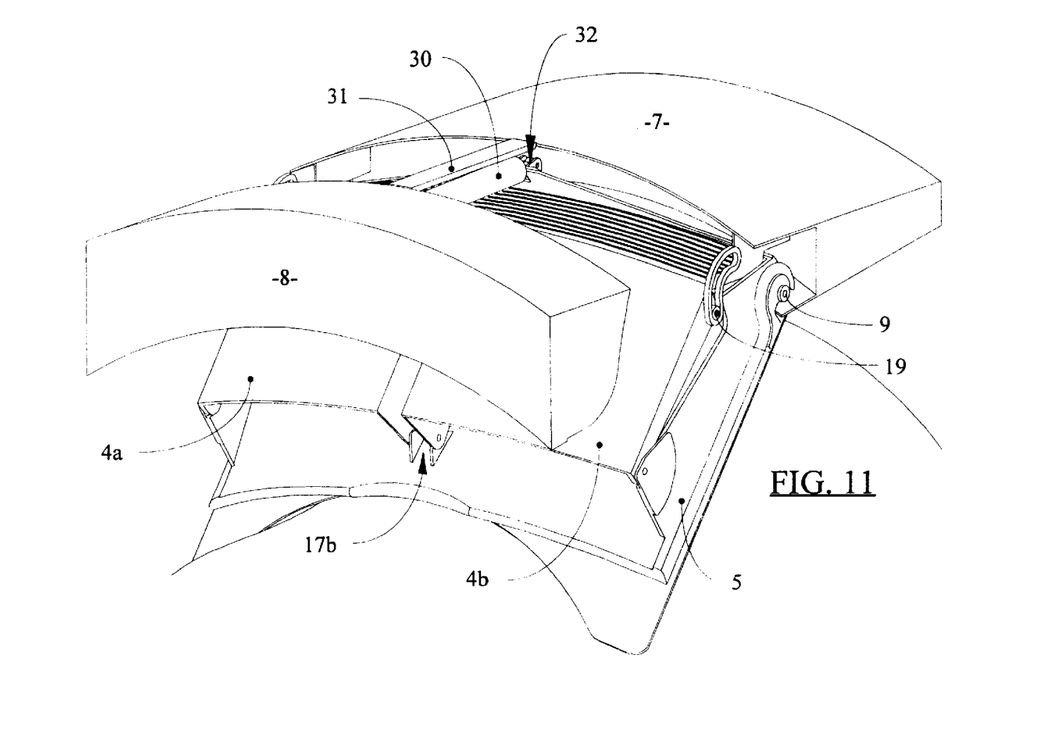
Figure 12:
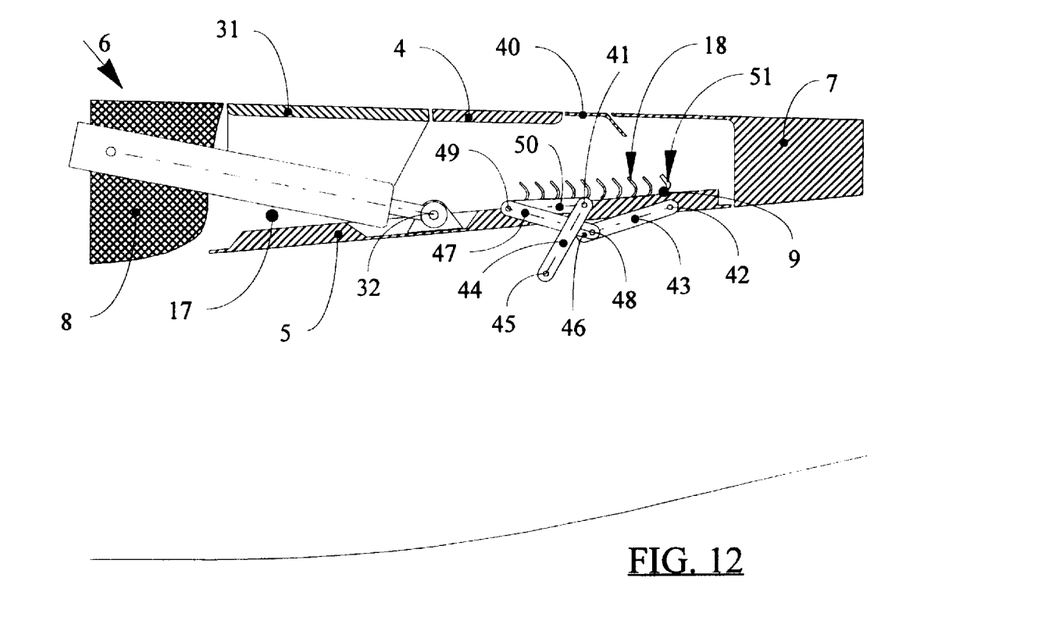
FIG. 12 is a view similar to FIG. 1 of another embodiment of a scoop-door thrust reverser according to the present invention with the door in a forward thrust position.
Figure 13:
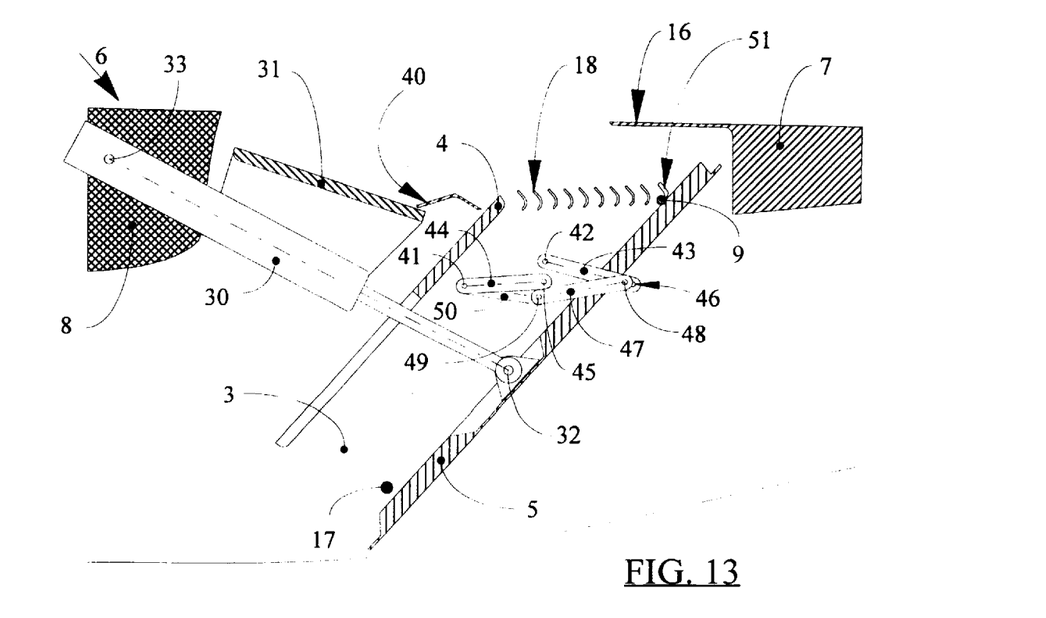
FIG. 13 is the embodiment of FIG. 12 but with the door in the reverse thrust position.
Figure 14:
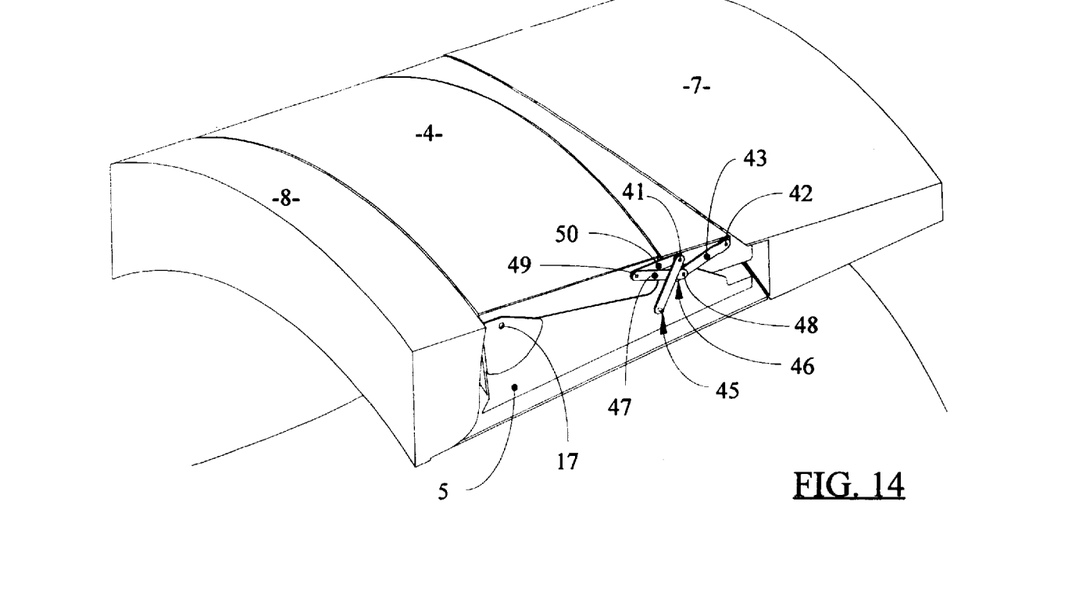
FIGS. 14, 15 are perspective views of the embodiment shown in FIGS. 12 and 13.
Figure 15:
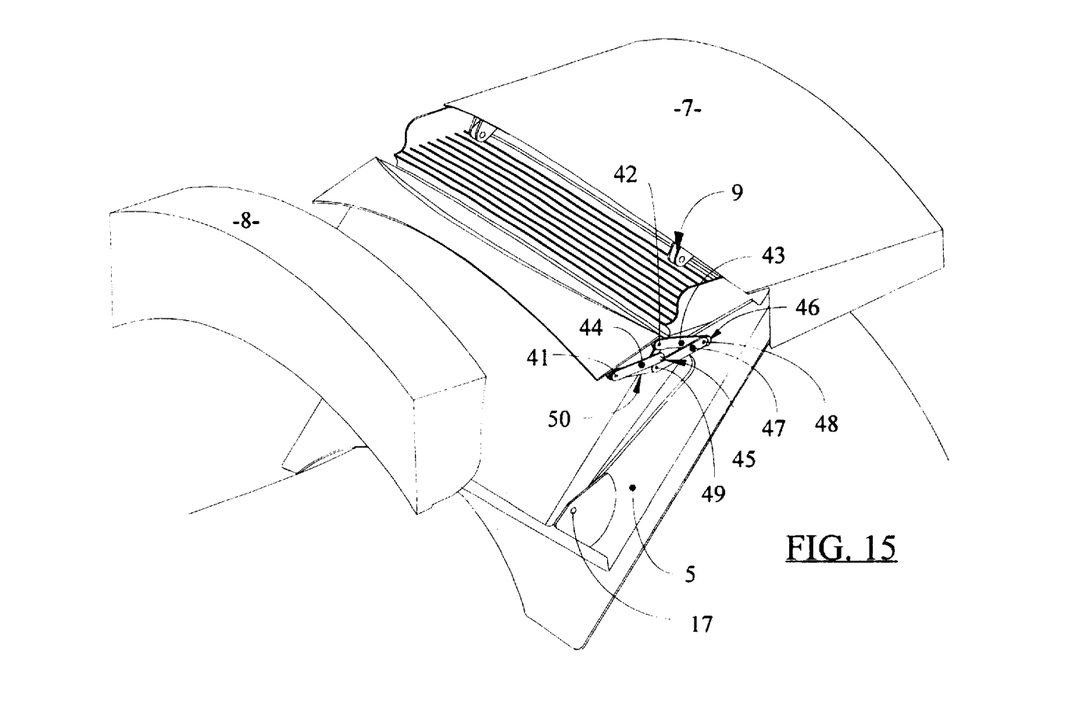

An intermediate pivot 17b, shown in FIG. 11, holding the inner side walls of the displaceable part of the outer structure 4 framing the linear actuator 30 acts both as a pivot relay and as structural reinforcement for the two displaceable parts 4a, 4b, as well as for the integral displaceable part of the outer structure 4.

To seal the cavity caused by housing the linear actuator 30 in the central structural gap, a fairing 31 is provided for the case of the actuator. An inside of this fairing 31 may be aerodynamically shaped to assist flow passage and direct the flow as close as possible to the inside of the fairing 31.

FIGS. 12, 13, 14 and 15 show an embodiment of the invention combining the technique of augmenting the exhaust cross-section S2 with a positioning of the upstream linear actuator 30 connected to the inner structure 5 such that the actuator axis extends internally with respect to the main pivot shaft 9 of the door 3 when the door 3 is in the forward thrust position.

To raise the main pivot shaft 9 in a centrifugal direction relative to the axis of the turbojet engine, the pivot fittings of the main pivot shaft 9 are each positioned between the central axis of the door 3 and its respective sidewalls according to a design known to the expert.

The linear actuator 30 is positioned on the stationary structure 6 hinging on the attachment point 33 of an upstream part 8 thereof. The attachment point 32 on the inside of the inner structure 5 is positioned between the upstream side of the inner structure 5 and the main pivot shaft 9. The two points 32 and 33 are situated in such a way that a line passing through these points extends internally of the main pivot shaft 9 of the door 3.

Using a scoop door with a "raised" main pivot shaft 9 strongly reduces the inherent clearance of the downstream vanes of the cascade 18 relative to a downstream fairing 16 when the door 3 is in the reverse thrust position. When the useful cutout of the downstream side of the displaceable part of the outer structure 4 relative to the upstreammost vane of the cascade of vanes 18 is combined with the cutout at the upstream side of the downstream fairing 16 required to freely pass the flow issuing from the door 3 in the thrust-reversal mode, a cavity will remain between these two fits when in the thrust-reversal mode. Using an intermediate fairing 40 which forms a part of the external streamlines of the cowling as defined in French patent application 97.06943 allows this cavity to be filled. The drive kinematics using the illustrative linkrods shown in FIGS. 12–15 drives the displaceable part of the outer structure 4. The fairing 40 has two drive and guide points 41, 42. A first linkrod 43 connects at a first point 46 to the door 3 and second linkrod 50 connects the first drive and guide point 41 at the downstream side of the displaceable part of the outer structure 4 to a second point 49.

To implement the displacement differential between the fairing 40 and the door 3, a third linkrod 44 connected to the second linkrod 50 at the first drive and guide point 41 hinges at a fixed point 45 connected to the stationary structure 6.

To implement the relative rotation of the displaceable part of the outer structure 4, a fourth linkrod 47 hinges on the first linkrod 43 at a third point 48 between the second drive and guide point 42 and the first point 46 of this linkrod 43. The fourth linkrod 47 is connected at the second point 49 to the displaceable part of the outer structure 4. Thanks to the angle formed between the forward-thrust and thrust-reversal positions, the distance subtended between the first point 46 and the third point 48 of the fourth linkrod 47 assures augmenting the exhaust cross-section S2 for thrust reversal. To facilitate and ensure appropriate positioning of the inner structure 5 relative to the cascade of vanes 18, the inside surface of the inner structure 5 may be continuous and make contact with a vane 51 at a downstream end of the cascade of vanes 18. The inner structure 5 may make sealing contact with the vane 51 and the vane 51 may be a structural part of the inner structure 5.

In this configuration, the position of the linear actuator 30 again creates a local cavity in the outer structure 4. The fairing 31 forming part of the external streamlines seals this gap.

The fairing 31 may be affixed to the linear actuator 30 in the same manner as in FIGS. 8 through 11. The fairing 31 also may be combined with the upstream portion of the stationary structure 6 and be mounted as a cantilever. Furthermore, it may be connected to and hinge on the upstream side of the displaceable part of the outer structure 4, and the upstream side of this fairing 31 may be guided on the casing of the linear actuator 30.

In another embodiment of the invention, the cascade of vanes 18 may be affixed to the door 3 instead of being stationary.

The full cascade 18 may be mounted on either the outer structure 4 or the inner structure 5 of the door 3. Alternatively, each structure 4 and 5 of the door 3 may support separate parts of the cascade of vanes 18 which move during rotation of the door 3 in order to mutually cooperate without affecting the kinematics of the rotation of the door 3 between the forward and reverse thrust positions.

We claim:

1. A thrust reverser for a bypass turbojet-engine having an external cowling, the engine generating a flow inside of the cowling and the cowling defining external streamlines, the thrust reverser comprising:

a stationary thrust-reverser structure (6);

a displacement control;

at least one pivotable hollow door (3) which is driven to rotate about a main pivot shaft (9) between a forward thrust position in which the door (3) forms a part of the external cowling and a reverse thrust position in which an upstream edge of the door (3) enters the flow such that the door (3) clears a passage in the external cowling and forms a flow deflecting baffle, the door (3) having an inner structure (5) and an outer structure (4) which together define an inner conduit (10) therethrough, the main pivot shaft (9) being disposed at a downstream side of the door (3) and resting on the stationary thrust-reverser structure (6), the door (3) being driven by the displacement control; and a mechanical drive system;

wherein at least a downstream part of the outer structure (4) of the door (3) is independent of and displaceable relative to the inner structure (5) of the door (3) such that a downstream effective exhaust cross-section (S2) of the inner conduit (10) is less than an upstream intake cross-section (S1) of the inner door conduit (10) when the door (3) is in the forward thrust position, so that the outer structure (4) corresponds with the external streamlines of the cowling, and the exhaust cross-section (S2) is at least equal to the intake cross-section S1 when the door (3) is in the reverse thrust position, the displaceable part of the outer structure (4) of the door (3) being driven in a centrifugal direction relative to the inner structure (5) of the door (3) by the mechanical drive system.

2. The thrust reverser according to claim 1, further comprising:

an auxiliary pivot shaft (17) disposed upstream from the main pivot shaft (9) and about which the displaceable part of the outer structure (4) pivots;

at least one guide slot (20) borne by the stationary thrust-reverser structure (6); and at least one roller (19) borne by the displaceable part of the outer structure (4), the roller (19) being arranged to move within the guide slot (20);

wherein the inner structure (5) pivots about the main pivot shaft (9) on the stationary thrust-reverser structure (6) and supports the displaceable part of the outer structure (4).

3. The thrust reverser according to claim 1, further comprising:

an auxiliary pivot shaft (17) disposed upstream from the main pivot shaft (9) and about which the displaceable part of the outer structure (4) pivots; and at least one linkrod (21) pivotably connecting the displaceable part of the outer structure (4) to the stationary thrust-reverser structure (6);

wherein the inner structure (5) pivots about the main pivot shaft (9) on the stationary thrust-reverser structure (6) and supports the displaceable part of the outer structure (4).

4. The thrust reverser according to claim 1, further comprising:

an auxiliary pivot shaft (17) disposed upstream from the main pivot shaft (9) and about which the displaceable part of the outer structure (4) pivots;

wherein the inner structure (5) pivots about the main pivot shaft (9) on the stationary thrust-reverser structure (6) and supports the displaceable part of the outer structure (4).

5. The thrust reverser according to claim 1, further comprising:

a stationary cascade of vanes (18) resting on the stationary thrust-reverser structure (6) and positioned such that the cascade of vanes (18) covers the exhaust cross-section (S2) of the inner conduit (10) of the door (3) when the door (3) is in the reverse thrust position.

6. The thrust reverser according to claim 2, further comprising:

a stationary cascade of vanes (18) resting on the stationary thrust-reverser structure (6) and positioned such that the cascade of vanes (18) covers the exhaust cross-section (S2) of the inner conduit (10) of the door (3) when the door (3) is in the reverse thrust position.

7. The thrust reverser according to claim 3, further comprising:

a stationary cascade of vanes (18) resting on the stationary thrust-reverser structure (6) and positioned such that the cascade of vanes (18) covers the exhaust cross-section (S2) of the inner conduit (10) of the door (3) when the door (3) is in the reverse thrust position.

8. The thrust reverser according to claim 4, further comprising:

a stationary cascade of vanes (18) resting on the stationary thrust-reverser structure (6) and positioned such that the cascade of vanes (18) covers the exhaust cross-section (S2) of the inner conduit (10) of the door (3) when the door (3) is in the reverse thrust position.

9. The thrust reverser according to claim 1, further comprising:

an auxiliary pivot shaft (17) resting on the inner structure (5) and about which the displaceable part of the outer structure (4) pivots;

wherein the displacement control comprises a central linear actuator (30) connected between the stationary thrust-reverser structure (6) and the door (3); and wherein the displaceable part of the outer structure (4) comprises two independent parts (4a, 4b) disposed with one on each side of the central linear actuator (30).

10. The thrust reverser according to claim 2 wherein the displacement control comprises a central linear actuator (30) connected between the stationary thrust-reverser structure (6) and the door (3); and wherein the displaceable part of the outer structure (4) comprises two independent parts (4a, 4b) disposed with one on each side of the central linear actuator (30).

11. The thrust reverser according to claim 3 wherein the displacement control comprises a central linear actuator (30) connected between the stationary thrust-reverser structure (6) and the door (3); and wherein the displaceable part of the outer structure (4) comprises two independent parts (4a, 4b) disposed with one on each side of the central linear actuator (30).

12. The thrust reverser according to claim 4 wherein the displacement control comprises a central linear actuator (30) connected between the stationary thrust-reverser structure (6) and the door (3); and wherein the displaceable part of the outer structure (4) comprises two independent parts (4a, 4b) disposed with one on each side of the central linear actuator (30).

13. The thrust reverser according to claim 5 wherein the displacement control comprises a central linear actuator (30) connected between the stationary thrust-reverser structure (6) and the door (3); and wherein the displaceable part of the outer structure (4) comprises two independent parts (4a, 4b) disposed with one on each side of the central linear actuator (30).

14. The thrust reverser according to claim 1, further comprising:

an auxiliary pivot shaft (17) disposed upstream from the main pivot shaft (9) and about which the displaceable part of the outer structure (4) pivots;

an intermediate fairing (40) which is disposed between the outer structure (4) of the door (3) and a downstream part (7) of the stationary thrust reverser structure (6) and forms a part of the external streamlines of the cowling when the door (3) is in the forward thrust position;

a first linkrod (43) connecting the intermediate fairing (40) to the door (3);

a second linkrod (50) also connecting the intermediate fairing (40) to the door (3);

a third linkrod (44) connecting the second linkrod (50) to the stationary thrust reverser structure (6); and a fourth linkrod (47) connecting the second linkrod (50) to an intermediate point (48) on the first linkrod (43);

wherein the displacement control comprises a linear actuator (30) connected between the stationary thrust-reverser structure (6) and the inner structure (5) such that an axis of the linear actuator (30) extends internally with respect to the main pivot shaft (9) when the door (3) is in the forward thrust position; and wherein the inner structure (5) pivots about the main pivot shaft (9) on the stationary thrust-reverser structure (6) and supports the displaceable part of the outer structure (4).

15. The thrust reverser according to claim 5 wherein a vane (51) at a downstream end of the cascade of vanes (18) is in contact with an inside surface of the inner structure (5) of the door (3) at least when the door (3) is in the forward thrust position.

16. The thrust reverser according to claim 5 wherein a vane (51) at a downstream end of the cascade of vanes (18) is in sealing contact with an inside surface of the inner structure (5) of the door (3) at least when the door (3) is in the forward thrust position.

17. The thrust reverser according to claim 1, further comprising:

a cascade of vanes (18) rigidly joined to the door (3).

18. The thrust reverser according to claim 2, further comprising:

a cascade of vanes (18) rigidly joined to the door (3).

19. The thrust reverser according to claim 3, further comprising:

a cascade of vanes (18) rigidly joined to the door (3).

20. The thrust reverser according to claim 4, further comprising:

a cascade of vanes (18) rigidly joined to the door (3).

* * * * *